April 9, 1968
J. B. BRISCOE ET AL
3,376,747
OIL LEVEL INDICATOR
Filed June 25, 1965
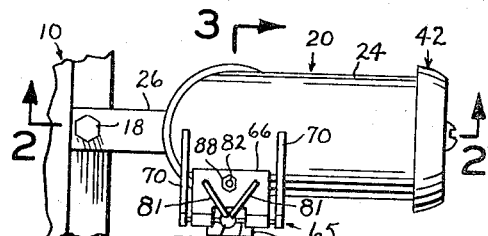
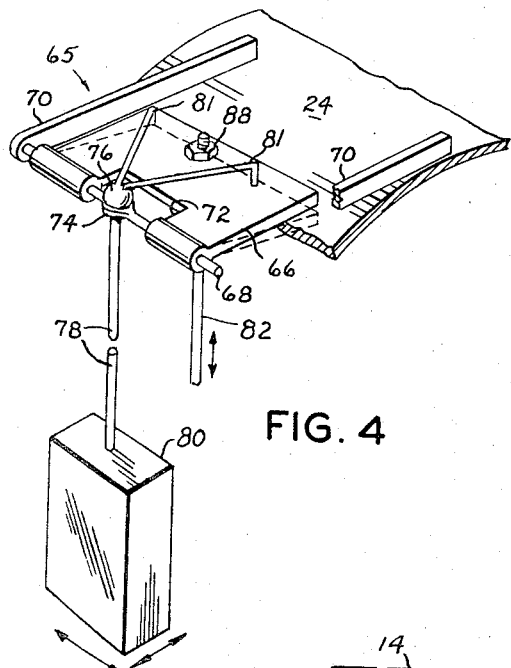
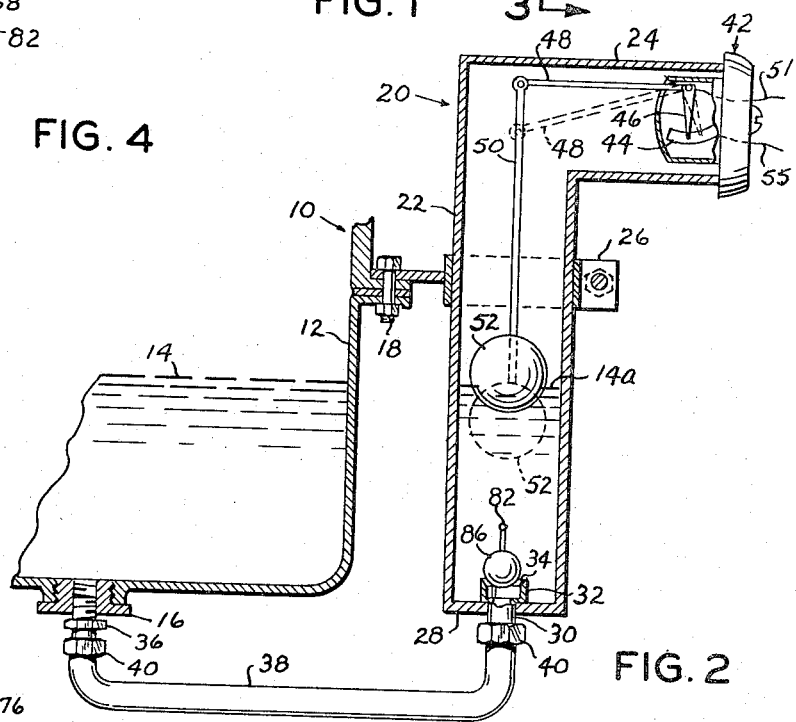
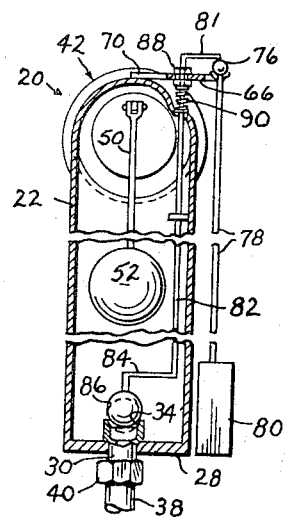
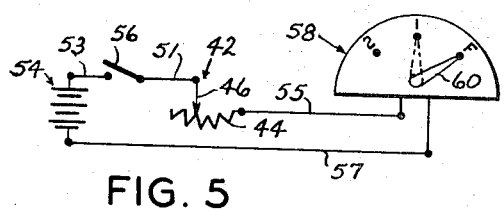
JOHN B. BRISCOE
JAMES E. BRISCOE
INVENTORS.
BY
*Robert K. Rhea*
AGENT 3,376,747
OIL LEVEL INDICATOR
John B. Briscoe, 6803 NW. 59 Terr., Bethany,
Okla. 73123, and James E. Briscoe, 3106
NW. 41, Oklahoma City, Okla. 73112
Filed June 25, 1965, Ser. No. 466,956
2 Claims. (Cl. 73—313)

ABSTRACT OF THE DISCLOSURE

An inverted L-shaped tubular member is mounted at one side of an engine of a moving vehicle and connected with its crank case drain plug for fluid communication between the crank case and the depending end of the L-shaped member. A float in the tubular member is connected by pivoting levers with a fluid level gage mounted on the other end of the tubular member in turn connected, by wiring through a battery, to an oil level indicator. A ball valve operated by a pendulum closes the lower opening to the tubular member when the vehicle is turning.

---

The present invention relates to automobile engines and more particularly to a crank case oil level indicator.

Motor vehicles are commonly provided with an oil gage rod which removably extends into the crank case to determine the oil level therein. This requires a periodical checking of the oil level while the engine is not running and is an inconvenience and is annoying particularly when the oil comsumption is substantial thus necessitating frequent stops to check the oil level. Various oil level indicating devices have been proposed heretofore but they have, for the most part, been objectionable and have not been used extensively. In general such devices have been complicated and expensive and have not been accepted by the manufacture or vehicle owners. For the most part these devices, shown by the prior art, could not easily be connected with existing vehicles.

The principal object of the present invention is to provide a continually operative signal system for indicating the level of oil within an engine crank case when the engine is running and when at rest.

Another object is to provide a simple and efficient oil level indicator which may be installed on a motor vehicle at the time of manufacture or at any time during the life of the vehicle.

Another object is to provide an oil level indicator which accurately indicates the quantity of oil in reserve when the motor is at rest, idling or during normal operation.

The present invention accomplishes these and other objects by connecting an auxiliary chamber to one side of an engine in communication with the crank case thereof through the drain plug. A float within the chamber actuates an indicator mounted on the vehicle dash.

Other objects will be apparent from the following description when taken in conjunction with the accompanying single sheet of drawings, wherein:

FIGURE 1 is a top view of the device connected with a fragment of an engine crank case;

FIGURE 2 is a vertical cross-sectional view taken substantially along the line 2—2 of FIG. 1;

FIGURE 3 is a vertical cross-sectional view of the device, per se, taken substantially along the line 3—3 of FIG. 1;

FIGURE 4 is a perspective view, to an enlarged scale, of a fragmentary portion of the device illustrating how a pendulum prevents inaccurate oil level readings when negatiating a turn with the vehicle; and, FIGURE 5 is a wiring diagram.

Like characters of reference designate like parts in those figures of the drawings in which they occur.

In the drawings:

The reference numeral 10 indicates a fragment of an automobile engine having a crank case 12 containing a reserve supply of oil 14. The crank case 12 is provided with a drain plug 16 and is connected to the upper portion of the engine by bolts or screws 18.

The numeral 20 indicates the device, as a whole, which is inverted L-shaped in general configuration. The device 20 includes a vertically disposed tubular leg 22 communicating with a lateral tubular portion 24. The vertical height of the tubular member 22 is preferably greater than the depth of the crank case 12. A clamp 26 surrounds the member 22 and is connected to the engine 10 by one of the crank case bolts 18. The depending end of the tubular member 22 is closed, as at 28, and is positioned substantially in the same horizontal plane defining the lowermost portion of the crank case 12. A tubular connector 30 projects through the closed end 28 and is provided with an enlarged inner flanged end portion 32 opening upwardly into the member 22. The upper inner surface end portion of the connector 32 is provided with a beveled seat 34 for the purposes presently explained.

The crank case drain plug 16 is centrally drilled and threaded for receiving a tubular connector 36. A short length of relatively small tubing 38 extends between the respective connectors 30 and 36 and is connected thereto by nuts 40 thus providing communication between the crank case and the interior of the member 22 so that the oil 14 within the crank case maintains a similar level of oil 14a in the tube 22. The outwardly open end of the member 24 is closed by a conventional rheostat-type fluid level gage 42. The gage 42 includes a coil 44 having an arm 46 slidably contacting the coil. A lever 48 is connected to the arm 46 and projects horizontally through the member 24 and is pivotally connected with a vertical lever 50 in turn connected at its depending end with a float 52 supported by the oil 14a.

Referring more particularly to FIG. 5, the fluid level gage 42 is connected by wires 51 and 53 to the automotive battery 54 through the vhicle ignition switch 56 and to an oil level indicator 58 mounted on the vehicle dash, not shown, by wires 55 and 57. The oil level indicator 58 includes an indicating arm 60 revealing the oil levels 14 and 14a in response to the position of the float 52 and its movement of the arm 46 along the coil 44. The relatively small connector tube 38 normally acts as an orifice in preventing sudden changes in the oil level 14a and a resultant inaccurate reading of the indicator 58 which would indicate oil needed to be added to the crank case. Thus, when the oil level 14 is lowered within the crank case, for any reason, the oil level 14a is also lowered so that the float 52 is positioned as shown by dotted lines (FIG. 2) moving the arm 46 along the coil 44. This results in positioning the indicator arm at position one, by way of example, indicating that one quart of oil should be added to the crank case. However, we have found that rapid acceleration or prolonged turning movement of the vehicle tends to induce the arm 60 to indicate a low oil level.

To prevent inaccurate readings of the indicator 58, during prolonged turns in either direction, a pendulum apparatus, indicated at 65 (FIG. 4) is added to the device 20. The apparatus 65 comprises a plate 66 pivotally supported for vertical movement about a horizontal axis by a pin or rod 68, connected to the upper surface of the member 24 in lateral and parallel off-set relation by a pair of support arms 70. The plate 66 is provided with a lateral opening or recess 72 to expose the central portion of the rod 68. Medially its ends, the rod 68 is provided with a ball receiving socket 74 for receiving a ball 76 having a support rod 78 extending downwardly through the socket 74. A pendulum 80 is connected to the depending end of the support rod 78. A pair of prongs 81 is connected at one end to the ball 76 and project outwardly in diverging relation therefrom and are turned down at their outward ends for contacting the upper surface of the plate 66 adjacent its edge opposite the rod 68. A stop rod 82 (FIG. 3) extends vertically through the member 22 adjacent its inner wall surface and is turned inwardly at its depending end, as at 84, to the axial center of the member 22 and is connected with a stop ball 86 removably engageable with the beveled surface 34. The upper end portion of the stop rod 82 projects loosely through suitable apertures formed in the member 24 and the plate 66 respectively. Nuts 88, threadedly engaged with the stop rod 82 on opposite sides of the plate 66, insure that the stop rod 82 moves vertically in response to vertical movement of the plate 66. A spring seat is formed on the upper surface of the member 24 and a spring 90 is interposed between the spring seat and lower one of the nuts 88 around the stop rod 82 to bear the weight of the plate 66, rod 82 and ball 86, to maintain the latter in unseated relation with respect to the beveled surface 34. Thus, a turning in either direction, of the vehicle or sudden acceleration moves the pendulum from its position of repose, wherein such movement causes one or both of the prongs 81 to bear against the upper surface of the plate 66 to force the latter downwardly compressing the spring 90 and seating the stop ball 86 on the beveled surface 34. When the pendulum is returned to its position of repose the spring 90 lifts the stop ball 86 out of engagement with the beleveled surface 34 to resume communication between the crank case 12 and tubular member 22. Similarly the oil within the member 22 may be trapped therein when draining the crank case 12, by moving and maintaining the pendulum 80 in a stop ball seated position.

Obviously the invention is susceptible to some change or alteration without defeating its practicability, and we therefore do not wish to be confined to the perferred embodiment shown in the drawings and described herein, further than we are limited by the scope of the appended claims.

We claim:
1. An oil level indicator for an engine having an oil containing crank case and having a drain plug in the crank case, comprising: an inverted L-shaped tubular member mounted adjacent said engine, said L-shaped member having a closed end disposed in the horizontal plane of the lowermost portion of said crank case; tubular means connected with the closed end of said L-shaped member and said drain plug for fluid communication between said crank case and said L-shaped member; an oil level gage connected to the other end of said L-shaped member; a float within said L-shaped member; a pair of pivotally interconnected arms connecting said float to said oil level gage; an indicator; wiring interconnecting said gage and said indicator with a source of electrical energy; and pendulum means for interrupting fluid communication between said crank case and said L-shaped member, said pendulum means comprising a seat formed on the end portion of said connector within said L-shaped member, a pair of laterally projecting arms connected with the upper end of said L-shaped member, a pin extending between the free ends of said arms, said pin having a socket medially its ends, a plate pivotally supported by said pin for vertical swinging movement, a stop rod extending through said plate and through said L-shaped member, a stop ball connected with the depending end of said stop rod, a ball positioned within said socket, a pair of prongs connected with said ball and extending toward and contacting the upper surface of said plate remote from said pin, and a pendulum secured to said ball.

2. An oil level indicator for an engine having an oil containing crank case and having a drain plug in the crank case, comprising: an inverted L-shaped tubular member; a clamp supporting said L-shaped member adjacent said crank case, the length of said L-shaped member being at least as great as the vertical height of said crank case; a tubular connector connected with said drain plug and the depending end of said L-shaped member; a conduit extending between and connected at its respective ends with said connectors providing communication between said crank case and said L-shaped member; a fluid level gage connected with the other end of said L-shaped member, said gage having a coil and having an arm slidably contacting the coil; a float within said L-shaped member; a pair of pivotally interconnected levers, one of said pair of levers connected to said arm, the other one of said pair of levers connected to said float; an indicator; wiring interconnecting said indicator and said fluid level gage with a source of electrical energy; pendulum means for interrupting fluid communication between said crank case and said L-shaped member, said pendulum means comprising a seat formed on the end portion of said connector within said L-shaped member, a pair of laterally projecting arms connected with the upper end of said L-shaped member, a pin extending between the free ends of said arms, said pin having an upwardly open socket medially its ends, a plate pivotally supported by said pin for vertical swinging movement toward and away from the upper surface of said L-shaped member, a stop rod extending vertically through said plate and through said L-shaped member, a stop ball connected with the depending end of said stop rod, a ball positioned within said socket, a pair of prongs connected with said ball in diverging relation and extending toward and contacting the upper surface of said plate adjacent its side opposite said pin, and a pendulum secured to said ball, whereby a lateral movement of said pendulum pivots said plate downwardly and seats said stop ball on said seat.

References Cited

UNITED STATES PATENTS

| | | | |
|---|---|---|---|
| 1,020,785 | 3/1912 | Warden | 73—317 |
| 1,281,050 | 8/1918 | Miller | 73—317 |
| 2,623,143 | 12/1952 | Laury | 73—308 X |
| 3,204,230 | 8/1965 | Hosford | 340—59 |

FOREIGN PATENTS

| | | |
|---|---|---|
| 361,512 | 11/1931 | Great Britain. |
| 490,319 | 8/1938 | Great Britain. |

LOUIS R. PRINCE, *Primary Examiner.*

D. M. YASICH, *Assistant Examiner.*